United States Patent
Popp

(10) Patent No.: US 6,619,139 B2
(45) Date of Patent: Sep. 16, 2003

(54) GAS FLOW SENSOR AND HIGH PRESSURE GASEOUS FUEL INJECTION SYSTEM

(75) Inventor: Roger C. Popp, Cheyenne, WY (US)

(73) Assignee: Enginuity, LLC, Fort Collins, CO (US)

(*) Notice: Subject to any disclaimer, the term of this patent is extended or adjusted under 35 U.S.C. 154(b) by 1 day.

(21) Appl. No.: 09/785,966

(22) Filed: Feb. 16, 2001

(65) Prior Publication Data

US 2002/0112704 A1 Aug. 22, 2002

(51) Int. Cl.[7] .............................................. G01F 1/37
(52) U.S. Cl. .................................................. 73/861.52
(58) Field of Search ........................ 73/861.51, 861.52, 73/861.53, 861.54, 861.55, 861.56, 861.57, 861.58, 861.64

(56) References Cited

U.S. PATENT DOCUMENTS

| | | | | |
|---|---|---|---|---|
| 4,194,394 A | * | 3/1980 | Bartholomaus | 73/861.54 |
| 4,366,706 A | | 1/1983 | Wolff | 73/119 |
| 4,545,345 A | | 10/1985 | Pagdin et al. | 123/299 |
| 4,724,864 A | * | 2/1988 | Schwelm | 73/861.56 |
| 4,942,860 A | | 7/1990 | Chujo et al. | 123/571 |
| 5,228,469 A | | 7/1993 | Otten et al. | 137/80 |
| 5,313,844 A | | 5/1994 | Kadlicko | 73/861.54 |
| 5,584,467 A | | 12/1996 | Harnett et al. | 251/129.07 |
| 5,595,163 A | | 1/1997 | Nogi et al. | 123/494 |
| 5,596,969 A | | 1/1997 | Lipinski | 123/494 |
| 5,722,373 A | | 3/1998 | Paul et al. | 125/446 |
| 5,747,702 A | * | 5/1998 | Kadlicko | 73/861.53 |
| 5,752,489 A | | 5/1998 | Henderson et al. | 123/494 |
| 5,816,224 A | | 10/1998 | Welsh et al. | 123/525 |
| 5,827,978 A | | 10/1998 | Kadlicko | 73/861.54 |
| 6,119,528 A | * | 9/2000 | Genack | 73/861.12 |

* cited by examiner

*Primary Examiner*—Harshad Patel
(74) *Attorney, Agent, or Firm*—Leydig, Voit & Mayer, Ltd.

(57) ABSTRACT

A novel flow sensor that includes a valve responsive to a pressure differential or pressure drop across a selectively sized restriction orifice. The flow sensor may be incorporated into a high-pressure fuel injection system for sensing the opening and closing of high pressure fuel injector for injecting gaseous fuel.

14 Claims, 3 Drawing Sheets

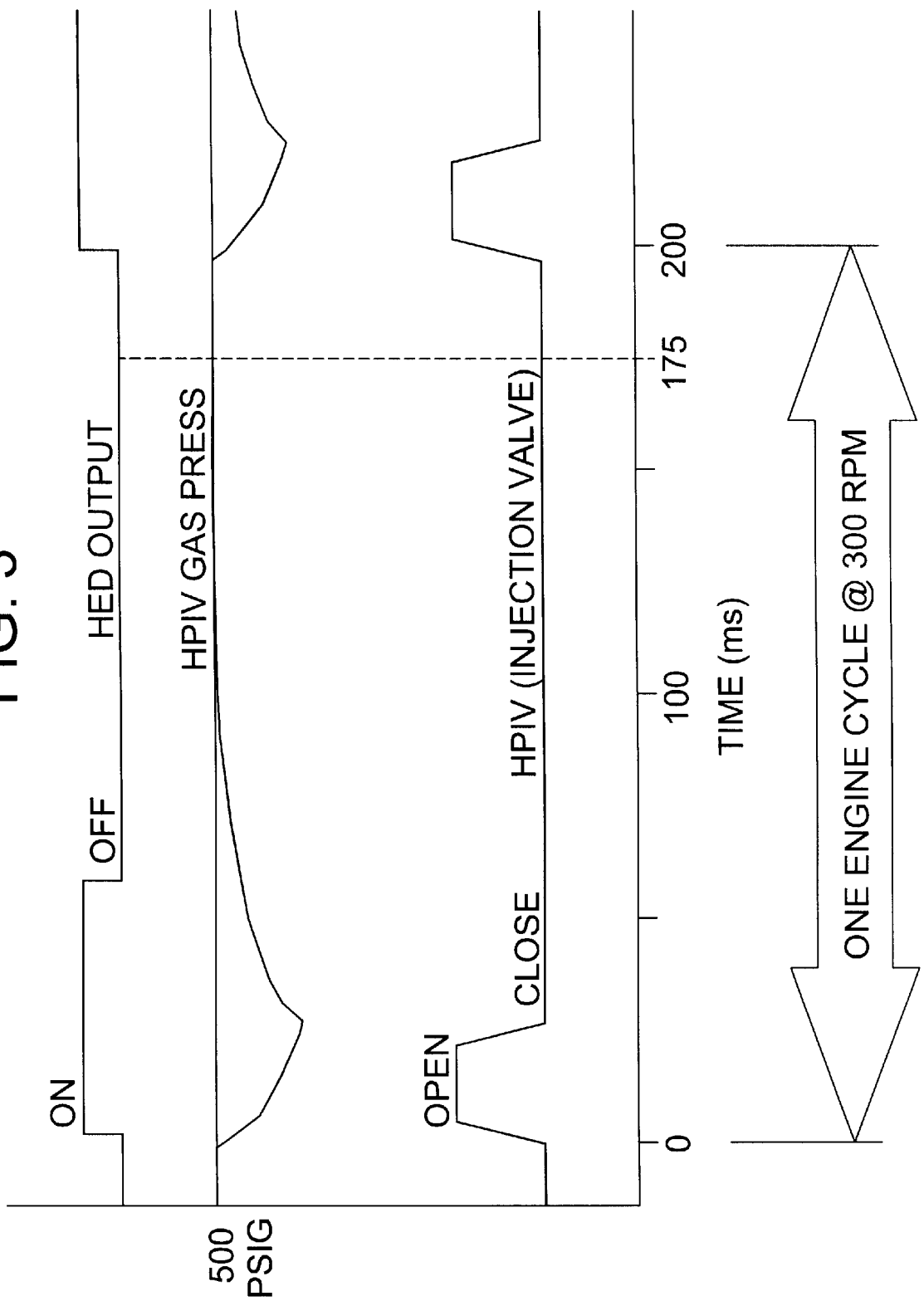

GAS FLOW SENSOR AND HIGH PRESSURE GASEOUS FUEL INJECTION SYSTEM

FIELD OF THE INVENTION

The present invention generally relates to fluid flow sensors and more specifically to gas flow sensors for detecting the flow of gas through a conduit, and is especially beneficial in a high pressure gaseous fuel injection system.

BACKGROUND OF THE INVENTION

The natural gas transmission industry uses a large number of large bore, 2-stroke and 4-stroke cycle, and gaseous fuel engines for compressing natural gas. For example, such engines are used to pressurize and to transport natural gas through the extensive network of natural gas pipelines that supply residential housing and commercial businesses. The network of natural gas pipelines typically operates at high pressure in the neighborhood of between 500 and 1000 psig.

These large bore, natural gas engines may be powered by a small portion of the natural gas passing through the pipelines. Normally, before being injected into the engine, the gas pressure is significantly reduced. Gaseous fuel is typically injected into the engine cylinders by mechanically actuated fuel injectors at pressures typically below about 60 psig. The high level of exhaust emissions and poor fuel economy of these engines, operating with this classical low-pressure fuel gas, has recently become an environmental and economic issue.

It has recently been demonstrated that not only improved exhaust emissions and improved fuel economy, but also improved engine performance can be achieved by injecting gaseous fuel at much higher pressures of about 500 psig (typically between 300 psig. and 1000 psig.). Subsequently, high-pressure fuel injection systems have been developed and are being installed on these large bore engines. The newly developed high-pressure fuel injection (HPFI) systems are electronically controlled, offering the opportunity to optimize fuel injection timing, fuel-air charge mixing, and the resulting combustion process. The injected high-pressure gas induces beneficial fuel-air charge mixing, resulting in efficient combustion.

The use of such high fuel gas pressures, while shown to be very beneficial to combustion quality, introduces a serious new concern. The concern is that if a high-pressure injection valve (HPIV) should fail in the open (gas flowing) condition, a very large quantity of gas will be injected into the engine cylinder in a short period of time. The result of such an occurrence could be serious engine damage, or other potentially hazardous conditions. The failure of an HPIV to close each engine cycle as intended can be caused by numerous possible events involving mechanical, hydraulic, and electronic components in the HPIV system. As a result, the safe and reliable operation of the HPFI system requires that effective safeguards be employed to reduce the quantity of gas injected in the event of a HPIV "fail open" event. Reliable and appropriate sensor feed back does not currently exist for such a system.

Another problem associated with the sensing HPIV failure is the difficulty in achieving adequate sensing device cyclic life. A practical application of sensing devices requires that such devices exhibit an operational life of at least 10,000 hours (about 180 million cycles), preferably 20,000 hours (about 360 million cycles) or more, of continuous operation without failure or the need for replacement. Even more desirable, are devices that not only exhibit this long uninterrupted service life, but which can be easily and inexpensively repaired.

SUMMARY OF THE INVENTION

It is an objective of the present invention to provide a novel flow sensor that is accurate, highly reliable, fast, and easily adaptable to a wide variety or sizes of fluid systems.

According to one aspect of the present invention, it is an objective of the present invention to provide a mechanism for indicating the proper opening and closing of high-pressure injection valves (HPIVs) in a high-pressure fuel injection system.

In accordance with these and other objectives, the present invention is directed toward a novel flow sensor that includes a spring biased piston responsive to a pressure differential or pressure drop across a selectively sized restriction orifice. The flow sensor includes a valve body assembly having an internal chamber, an inlet passage for connection to the high-pressure source and an outlet passage for connection to the high pressure fuel injection valve or other downstream plumbing orifice. The piston is disposed in the internal chamber for movement that may be sensed. A position sensor in sensory communication with the piston has an output indicating the position of the piston relative to the body assembly. The restriction orifice is arranged between the inlet passage and outlet passage and divides the internal chamber into an inlet pressure region acting on a first end portion of the piston and an outlet pressure region acting on a second end portion of the piston. The piston is biased to one position (preferably by a spring or possibly other such means such a fluid pressure or gravity for example) such that a pressure drop, caused by flow exiting the outlet chamber, is adapted to overpower the force of the bias to move the piston toward a second position.

Other objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention, and together with the description serve to explain the principles of the invention. In the drawings:

FIG. 3 is graph diagram of one engine cycle for the high pressure fuel injection system of FIG. 2.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE PREFERRED EMBODIMENTS

Figure 1:
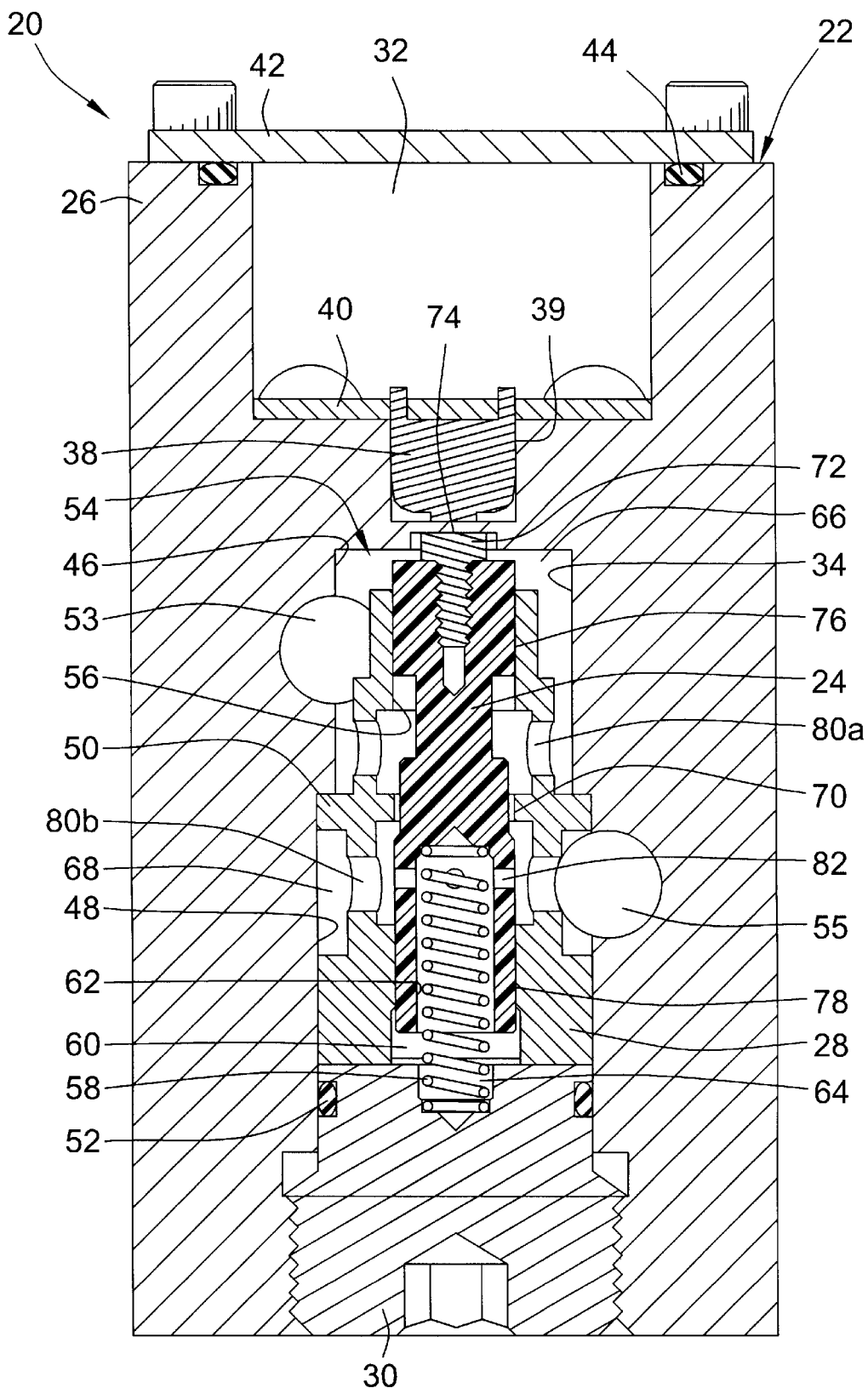
FIG. 1 is a cross section of a gas flow sensor according to a preferred embodiment of the present invention.

For purposes of illustration, a preferred embodiment of the present invention has been depicted in FIG. 1 as a novel gas flow sensor 20. The gas flow sensor 20 generally includes a body assembly 22 having a linearly reciprocating piston 24 mounted therein.

The body assembly 22 includes a body 26, an inserted sleeve 28 and a retaining plug 30. Cavities 32 and 34 are formed in opposing axial ends of the body 26. The upper cavity 32 receives the electronic sensing means which comprises a suitable sensor which in a preferred embodiment takes the form of a Hall Effect detector 38 mounted in a reduced diameter central bore 39 and a printed circuit board 40 mounted into the bottom of the upper cavity 32 via screws to also retain the Hall Effect detector 38. A cover plate 42 is mounted to the body 26 via screws to enclose the upper cavity 32 and electronic sensing means contained therein. An o-ring gasket 44 compressed between the cover plate 42 and body 26 protectively seals the upper cavity 32.

The lower cavity 34 includes larger and smaller diameter bore sections 46, 48, both coaxial with the central reduced diameter bore 39 for the Hall Effect detector 38. The sleeve 28 is slidably inserted into the lower cavity 34 and includes an annular shoulder 50 which seats against the radially planar juncture between larger and smaller diameter bore sections 46, 48. The retaining plug 30 screws into the bottom end of the body 26 to urge the sleeve 28 against its seat and enclose the lower cavity 34. An o-ring gasket 52 forms a radial seal between the retaining plug 30 and body 26 to seal off an internal gas chamber 54 within the body 26. The internal gas chamber 54 is connected with axially spaced apart laterally drilled inlet and outlet passages 53 and 55 formed into the body 26.

The piston 24 slides and linearly reciprocates within a central bore 56 formed into the sleeve 28. The piston 24 is biased in one axial direction by appropriate biasing means shown in the preferred embodiment as a spring 58. Other possible biasing means could include gravity or fluid pressure or other similar resilient mechanism. The spring 58 is mounted in spring chamber 60 which includes diametrically opposed cylindrical cavities 62, 64 formed in the bottom axial end of the sleeve 28 and upper axial end of the retaining plug 30, respectively.

The configuration of the body 26, sleeve 28 and piston 24 divide the internal gas chamber 54 into an upper inlet chamber 66 and a lower outlet chamber 68. The upper inlet chamber 66 is connected to the inlet passage 53 and a lower outlet chamber 68 is connected to the outlet passage 55. The inlet chamber 66 and outlet chamber 68 are connected by a restriction orifice 70 or metering orifice that takes the form of an annular gap between the outer diameter section of the piston 24 and the inner diameter section of the sleeve 28.

Figure 2:
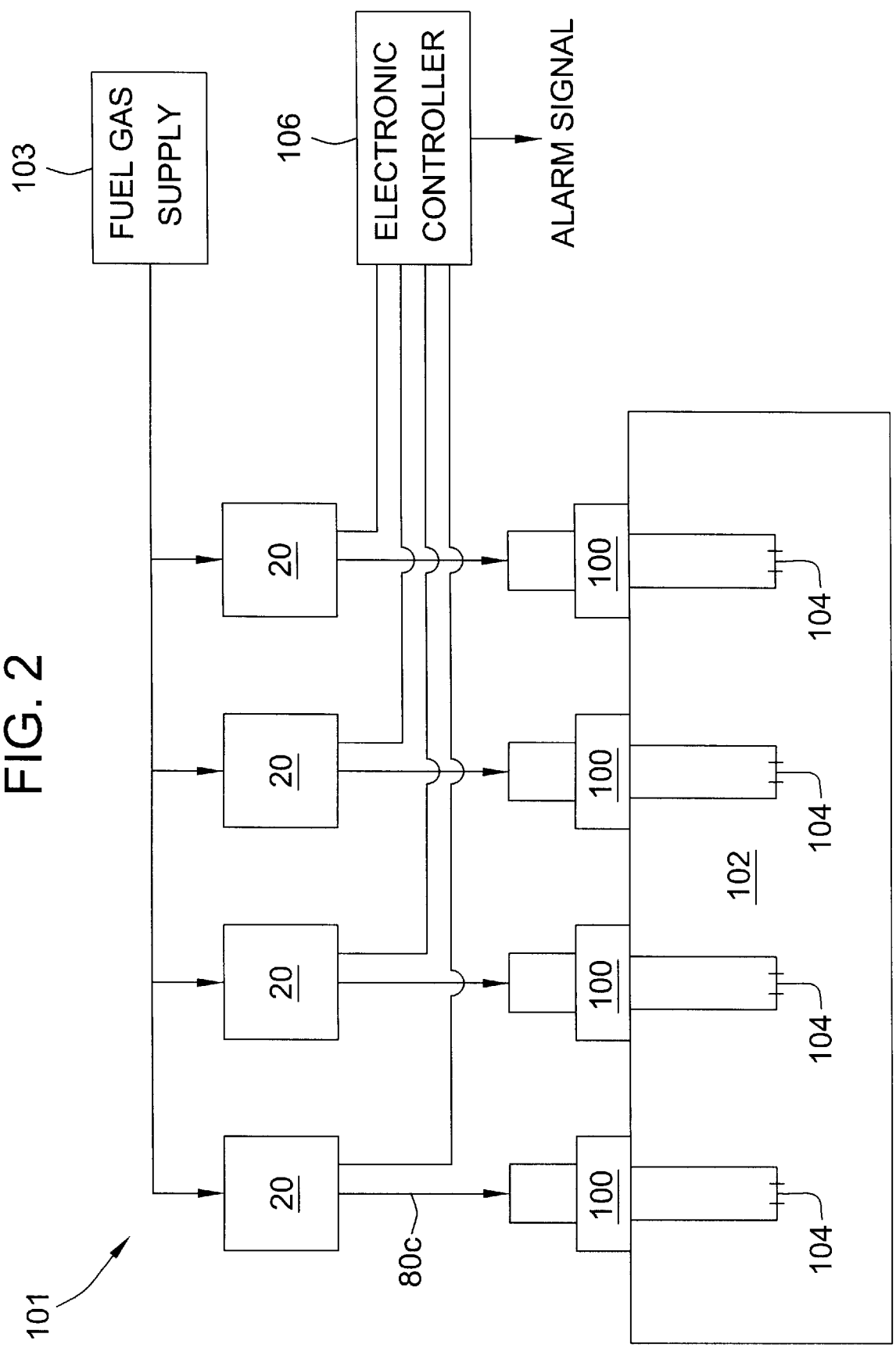
FIG. 2 is a schematic illustration of multiple gas flow sensors arranged in a high pressure fuel injection system, which is one of the exemplary applications for the novel gas flow sensor.

With a general understanding of the structure of the gas flow sensor 20, detail can now be had to the operation of the gas flow sensor 20. It should be understood that the gas flow sensor 20 is intended to be used for sensing flow through an associated valve (either upstream or downstream) which in exemplary application shown in FIG. 2 takes the form of a downstream fuel injector 100 (also referred to as "HPIV" which is short for "high pressure injector valve") which cyclically opens and closes to inject fuel into a cylinder of an engine 102. Referring briefly to FIG. 2 in which a high pressure gaseous fuel injection system 101 is schematically illustrated, this exemplary application for the gas flow sensor 20 illustrates the gas flow sensor arranged between an upstream high pressure gaseous fuel source 103 having a substantially constant operating pressure (typically between about 300 and 700 psi) and a downstream fuel injector 100. Pairs of fuel injectors 100 and gas flow sensors 20 are arranged in parallel circuit such that each fuel injector has its own sensing mechanism and feedback to an electronic controller 106.

In operation, high pressure gas enters the inlet passage 53 passes through radial holes 80a, annular restriction 70 radial holes 80b, outlet passage 55, pressurizing the downstream piping 80c and the closed fuel injector 100, such that all passages between the fuel supply 103 and the injector 100 become pressurized at fuel gas supply pressure and all fluid flow stops. When the fuel injector 100 opens, gas quickly exits through the outlet orifice 104 drawing from the outlet passage 55 which in turn decreases the pressure in outlet chamber 68. Although the outlet chamber 68 is recharged by the gas pressure from the inlet chamber 66, the restriction orifice 70 limits the speed of recharge to slower than the gas escaping through the outlet orifice 104 such that a substantial pressure decrease occurs in the outlet chamber 68. This creates a pressure differential across the opposing axial ends of the piston 24 (one axial end being subject to the pressure of inlet chamber 66 and the other axial end being subject the pressure of the outlet chamber 68). The pressure differential and specifically the greater pressure applied against the top axial end of the piston 24 overcomes the force of the spring 58 at a predetermined pressure differential to cause the piston 24 to linearly translate away from Hall Effect detector 38. Once the downstream fuel injector 100 closes, the outlet chamber 68 then recharges completely through the continued flow through the restriction orifice 70 which reduces or eliminates the pressure differential to translate the piston 24 back to its home position.

At this point it should be apparent that the restriction orifice 70 is selectively sized such that cyclical opening and closing of the fuel injectors effect a similar cyclical pressure drop across the piston 24. The biasing force provided by the spring 58 is also set to crack at a predetermined pressure differential across the piston 24 that should be set greater than normal system pressure fluctuations. To ensure proper positioning of the piston 24, the sleeve includes two separated cylindrical bores or piston guides 76, 78 on each side of the restriction orifice 70, minimizing radial play in the position of the piston 24. Cross holes 80a in the sleeve 28 ensure proper equalization of pressure throughout the entire inlet chamber 66 while cross holes 80b similarly ensure proper equalization of pressure throughout outlet chamber 68. The total area for each set of cross holes 80a and 80b is substantially greater than the flow area of the restriction orifice 70 to ensure that only insubstantial or insignificant pressure differentials exist other than that across the restriction orifice 70.

To sense the position of the piston 24 appropriate sensing means is provided. Such sensors as proximity switches or other suitable sensors may be used. However, the use of a Hall Effect detector 38 has been found to be particularly advantageous. The Hall Effect detector 38 senses a change in a magnetic field and outputs a signal based on that change. In this regard, the body 26 is preferably formed of non-magnetic material such as aluminum so that it has no effect on sensing. The inserted sleeve 28 may be steel but the end is disposed far enough away from the Hall Effect detector 38 so as not to affect the sensor output. The piston 24 is also likewise formed of nonmagnetic material, in this case lightweight, durable high strength plastic such as Delrin®, however, a magnetic target in this case a metallic screw 72 is mounted in the axial end of the piston 24 proximate the Hall Effect detector 38. With this arrangement of non-magnetic materials around the Hall Effect Detector 38 except for the magnetic target/screw 72, as the piston 24 linearly reciprocates, the Hall Effect detector 38 can accurately determine the position of the screw 72 and therefore the piston 24. The use of a steel screw 72 as the magnetic target is advantageous being commonly available and inexpensive. The screw threads provide the subtle advantage of reliably securing the target to the polymer piston without generating significant radial stresses in the piston.

The Hall Effect detector 38 also advantageously allows the internal gas chamber 54 to be completely isolated from the sensor cavity 32 containing the electronics. Specifically, a thin partition wall 74 integral with the body 26 isolates the internal gas chamber 54 from the sensor cavity 32 such that no seals therebetween are required. The Hall Effect detector 38 works through the partition wall 74 and the electromagnetic field is unaffected by the aluminum contained with the partition wall 74. It is an advantage that the non-magnetic partition wall 74 and the sealed cover plate 42 isolate the electronic sensing means and electrical wiring regions from the potentially hazardous fuel gas, allow these components to reside in benign atmospheric conditions, thereby avoiding potentially hazardous intermingling of electrically energized components with combustible gas mixtures.

As is apparent at this point, the position of the piston 24 is indicative of whether the downstream fuel injector 100 is open or closed. A cycle of normal opening and closing of the fuel injector 100 is illustrated in FIG. 3 along with lines illustrating the gas pressure in the outlet chamber 68 and output of the Hall Effect detector 38. As shown in FIG. 3, the fuel injector 100 opens and closes causing an associated fall and recovery of the gas pressure within HPIV 100. As the gas pressure in the HPIV falls, gas flows from the supply 103 through the flow sensor passages causing a pressure differential across piston 24. Once the pressure differential exceeds the force of the spring 58, the piston 24 translates away from Hall Effect device 38 and the HED output goes "ON", indicating that pressure in outlet chamber 68 has dropped below a predetermined value. When the injection valve closes, the flowing gas pressurizes the HPIV causing the gas pressure in outlet chamber 68 to rise. This results in a reduced gas flow through the flow sensor passages, reducing the differential pressure across the piston 24. When the pressure differential is too small to support the force of spring 58, the piston translates back towards the HED 38, and the HED output goes "OFF". (Note: HED outputs of "ON" and "OFF" can just as easily be reversed, typically a choice in such devices—such alternatives are fully equivalent and mean the same thing).

To use the output from the gas flow sensor, the illustrated high pressure gaseous fuel injection system 101 further comprises an electronic controller 106 responsive to the electrical output of each gas flow sensor 20 for monitoring purposes. When the HED output goes "ON", the controller starts a preset electronic timer. When the time expires, the state of the HED output is checked. If the HED output is still "ON", the controller interprets that the injector is open too long. In this way, the electronic controller 106 times and compares the output of each gas flow sensor output (see output shown in FIG. 3) to the stored preset time range corresponding to a predetermined time period in which flow sensor should be in either the corresponding first or second position, which would indicate proper operation of the fuel injector 100. If the electronic controller 106 monitors a time period that falls outside of the stored preset time range (allowing for normal minor fluctuations in sensed time periods), then an alarm signal is activated. The alarm signal could be monitored manually, or alternatively be used to shut off gas flow to each or all individual fuel injectors 100 via a shut-off valve, or alternatively be used to shut down the engine 102. To allow for different operating parameters for the engine 102, the stored preset time values in the electronic controller 106 may also be adjusted to be longer or shorter, either automatically (e.g. relative to engine speed) or manually such that the stored preset time range is adjusted relative to the predetermined cyclical time interval for each cycle of the engine.

The benefits of the gas flow sensor 20 may be best seen with reference to FIG. 3. Using the example of FIG. 3, at the common constant engine operating speed of 300 rpm, the time between cylinder firings, for any particular cylinder is about 200 milliseconds. The time that the fuel injector 100 is injecting fuel is typically about 5 to 30 milliseconds. The fuel injector 100 gas refill time that follows closure of the fuel injector 100 is typically about another 70 to 100 milliseconds. So the gas flow sensor 20 is typically expected to turn back "OFF" about 25 to 130 milliseconds after it turns "ON" each engine cycle. This leaves ample time, roughly 70 to 125 milliseconds, within each engine cycle to reliably check the flow sensor output state before the next cylinder firing. In this 300 rpm application example, the flow sensor controller would be typically programmed to check the flow sensor output state about 175 milliseconds after its "ON" state occurs. If the sensor is "OFF" the sensor controller considers the fuel injector to be functioning properly. However, if the fuel injector 100 fail to close contrary to expectation, the incoming fuel gas would continue to flow, the flow sensor would not be turned "OFF" at the time that the controller checked the sensor output state, and an alarm signal would instantly be issued. In a typical application of the flow sensor 20 still another valuable feature is incorporated by appropriately programming the companion electronic controller 106. This feature is that of continuously monitoring the operation of each flow sensor 20 to be sure that both "ON" and "OFF" signals are being routinely and continuously generated each engine cycle. This "self checking" condition is an indication that both the flow sensors and the fuel injectors are operating properly.

A further advantage of the Hall Effect detector is that it is inherently designed to exhibit hysteresis characteristics whereby the piston positions related to the "ON" and "OFF" state are suitably separated. This phenomenon is a classical way to prevent switching state instability should the target hover in the vicinity of the switching point.

Another important function of the gas flow sensor 20 as arranged in the system 101 illustrated in FIG. 2 is to appropriately restrict the flow rate of fuel gas from the fuel gas supply line to the fuel injectors 100. Experience has shown that if this gas flow rate is too large, resulting in quick refill of the fuel injectors each cycle, pressure pulsations are generated in the gas supply lines. These pressure pulsations could otherwise cause transient flows through the gas flow sensors 20, causing the sensor pistons to oscillate, resulting in extraneous "ON" and "OFF" states of the detector outputs. Not only would this phenomenon occur within the particular supply lines to each fuel injector, but these pressure transients would also travel through the gas supply lines interconnecting parallel circuits on the engine, such that the pressure pulsation generated by one line could disturb the gas pressure in adjacent connected parallel lines. If unchecked, this unstable gas pressure condition would otherwise upset the operation of the flow sensors making them unstable. However, the restriction orifice 70 which meters and slows the recharge process quells these pressure pulsation problems. Simply by establishing the flow area of the restriction orifice 70 avoids the need for a separate restriction in the system. Reduced system pressure pulsation and spreading out the recharge over a longer time interval also has the advantage of reducing impact forces on the gas flow sensor piston 24, thereby improving reliability and life expectancy.

A couple of additional advantages of the disclosed embodiment will be discussed here further. By adeptly choosing the bias spring force and the piston diameter (frontal area), the annular restriction orifice can be made desirably large. This makes the annular restriction orifice quite insensitive to contamination induced plugging or jamming of the piston. Also, while the piston strokes or reciprocates in the flow sensor, its surface and outer diameter that forms the annular restriction orifice remains constant, such that the size of the annular restriction orifice or gap between the piston and sleeve also remains constant. The piston motion also induces a self cleaning action in the event that large contaminant particles lodge in the restriction orifice.

A further advantage of the disclosed embodiment is that the piston guide surfaces are disposed sufficiently away from the main gas flow stream from the inlet to the outlet and through the restriction orifice. These annular guide clearances, due to the pressure equalizing effects of the radial holes 80a and 82, minimize the gas pressure differential across the guide clearances. Each of these factors serves to reduce the possibility of inducting contaminant particles into the guide clearances which might otherwise cause friction for jamming the piston. This feature improves and maximizes flow sensor reliability.

The foregoing description of various preferred embodiments of the invention has been presented for purposes of illustration and description. It is not intended to be exhaustive or to limit the invention to the precise forms disclosed. Obvious modifications or variations are possible in light of the above teachings. The embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A gas flow sensor for sensing flow, comprising:
   a flow sensor body assembly having an internal chamber, an inlet passage and an outlet passage;
   a piston linearly reciprocable in the internal chamber;
   a position sensor axially aligned with the piston and in sensory communication with the piston, having an output indicating the position of the piston relative to the flow sensor body assembly, the position sensor providing only an on-off output rather than a variable output;
   a fixed size restriction orifice between the inlet passage and outlet passage dividing the internal chamber into an inlet pressure region acting on a first end portion of the piston and an outlet pressure region acting on a second end portion of the piston, the restriction orifice being sized to create a pressure differential across the piston when gas flows through at least one of the inlet and outlet passages; and
   wherein the piston is biased to one position, said pressure differential is adapted to overpower the force of the bias to move the piston toward a second position.

2. The gas flow sensor of claim 1 wherein the flow sensor body assembly includes a body and a sleeve mounted in the body, the piston being mounted for sliding movement in a cylindrical bore defined by the sleeve the cylindrical bore including spaced apart first and second guide portions engaging the surface of the piston and an annular gap between the piston and the sleeve at a location between the first and second guide portions, the annular gap providing the restriction orifice, said annular gap connecting the inlet pressure region and the outlet pressure region.

3. The gas flow sensor of claim 2 wherein the body and piston are made of non-magnetic material, the piston having a magnetic target mounted in one end of the piston, and wherein the sensor is a hail effect detector mounted in the body proximate said one end of the piston but completely fluidically isolated from the chamber by a partition of non-magnetic material integrally in the body for safety purposes when the gas is a fuel, the hall effect detector adapted to sense a change in magnetic field based on the position of the target mounted in the piston.

4. The gas flow sensor of claim 3 wherein the piston is plastic, the body is aluminum and the sleeve is steel.

5. The gas flow sensor of claim 3 wherein the hall effect detector is mounted in a sensor chamber defined in the body, the flow sensor body assembly further comprising a cover plate enclosing the sensor chamber.

6. The gas flow sensor of claim 3 further comprising a spring providing said bias mounted in a spring cavity defined partly by one end of the piston and a retaining plug securing the piston guide sleeve inside the valve body, the spring engaging the retaining plug, further including at least one relief hole formed in the piston connecting the spring chamber with the outlet pressure region.

7. A gas flow sensor, for interposition between a high pressure source of gas and a valve having an outlet orifice for discharging the gas comprising:
   a body having an internal chamber, an inlet passage for connection to the high pressure source and an outlet passage for connection to the valve;
   a guide sleeve mounted in the body defining a cylindrical bore;
   a retaining plug securing the guide sleeve in the body;
   a piston mounted in the cylindrical bore for linear sliding movement therein, the guide sleeve providing spaced apart first and second guide portions engaging the surface of the piston;
   a position sensor in sensory communication with the piston, having an electrical output indicating the position of the piston relative to the body;
   a restriction orifice arranged between the inlet passage and the outlet passage dividing the internal chamber into a inlet pressure region acting on a first end portion of the piston and an outlet pressure region acting on a second end portion of the piston, wherein a pressure drop is effected across the restriction orifice when gas flows out the outlet passage, wherein the restriction orifice is an annular gap defined between the piston and sleeve at a location between the first and second guide portions, said annular gap connecting the inlet and outlet passages; and
   a spring biasing the piston to one position, said pressure drop adapted to overpower the force of the spring to move the piston toward a second position.

8. The gas flow sensor of claim 7 wherein the body and piston are made of non-magnetic material, the piston having a magnetic target mounted in one end of the piston, and wherein sensor is a hall effect detector mounted in the body proximate said one end of the valve piston but completely fluidically isolated from the chamber by a partition of non-magnetic material integrally in the body for safety purposes when the gas is a fuel, the hall effect detector adapted to sense a change in magnetic field based on the position of the target mounted in the piston.

9. The gas flow sensor of claim 8 wherein the piston is plastic, the body is aluminum and the sleeve is steel.

10. The gas flow sensor of claim 9 wherein the hall effect detector is mounted in a sensor chamber defined in the body, the flow sensor body assembly further comprising a cover plate enclosing the sensor chamber.

11. The gas flow sensor of claim 8 wherein the body is formed from a solid block to include a first cavity at one end of the solid block in which the guide sleeve and piston are slidably inserted such that they are capable of being slidably removed for maintenance, the retaining plug being screwed into the valve body to enclose the first cavity and being removable to allow for maintenance, the retaining plug supporting the spring.

12. The gas flow sensor of claim 11 wherein the body includes a second cavity at another end of the solid block, the position sensor mounted in the second cavity.

13. The gas flow sensor of claim 12 wherein the first cavity includes an annular shoulder between the inlet passage and outlet passage supporting the sleeve against an axial retaining force of the retaining plug.

14. The gas flow sensor of claim 7 wherein the position sensor is axially aligned with the piston, and wherein the position sensor provides only an on-off output rather than a variable output.

* * * * *

UNITED STATES PATENT AND TRADEMARK OFFICE
CERTIFICATE OF CORRECTION

PATENT NO. : 6,619,139 B2  Page 1 of 1
DATED : September 16, 2003
INVENTOR(S) : Roger C. Popp It is certified that error appears in the above-identified patent and that said Letters Patent is hereby corrected as shown below:

Column 7,
Line 66, after "sleeve", insert -- , --

Column 8,
Line 9, after "sleeve", change "hail" to -- hall --

Signed and Sealed this

Fourth Day of November, 2003

JAMES E. ROGAN
*Director of the United States Patent and Trademark Office*